United States Patent
Morita et al.

(10) Patent No.: US 11,723,391 B2
(45) Date of Patent: Aug. 15, 2023

(54) SWEETENER COMPOSITION AND FOOD CONTAINING SAME

(71) Applicant: MORITA KAGAKU KOGYO CO., LTD., Osaka (JP)

(72) Inventors: Toyoshige Morita, Osaka (JP); Akira Takada, Osaka (JP)

(73) Assignee: MORITA KAGAKU KOGYO CO., LTD., Osaka (JP)

(*) Notice: Subject to any disclaimer, the term of this patent is extended or adjusted under 35 U.S.C. 154(b) by 228 days.

(21) Appl. No.: 15/556,638

(22) PCT Filed: Mar. 11, 2016

(86) PCT No.: PCT/JP2016/001394
§ 371 (c)(1),
(2) Date: Sep. 8, 2017

(87) PCT Pub. No.: WO2016/143361
PCT Pub. Date: Sep. 17, 2016

(65) Prior Publication Data
US 2018/0049455 A1  Feb. 22, 2018

(30) Foreign Application Priority Data
Mar. 11, 2015 (JP) ................. 2015-048868

(51) Int. Cl.
*A23L 27/30* (2016.01)
*A23L 27/00* (2016.01)

(52) U.S. Cl.
CPC ............. *A23L 27/36* (2016.08); *A23L 27/00* (2016.08); *A23L 27/86* (2016.08)

(58) Field of Classification Search
CPC .................................. A23L 27/36; A23L 27/86
See application file for complete search history.

(56) References Cited

U.S. PATENT DOCUMENTS

2010/0112171 A1   5/2010  Abelyan et al.
2014/0227421 A1   8/2014  Markosyan
2014/0335264 A1  11/2014  Shi et al.
(Continued)

FOREIGN PATENT DOCUMENTS

WO   WO-2010/038911 A1   4/2010
WO   WO-2010/146463 A2  12/2010
(Continued)

OTHER PUBLICATIONS

Extended European Search Report for European Application No. 16761333.0 dated Jul. 9, 2018.
(Continued)

*Primary Examiner* — Changqing Li
(74) *Attorney, Agent, or Firm* — Marshall, Gerstein & Borun LLP (57) ABSTRACT

The present invention provides a sweetener composition that can be used for food as a sugar substitute sweetener. Specifically, the sweetener composition contains rebaudioside O and rebaudioside N as active ingredients, or contains at least one of rebaudioside D and rebaudioside M and at least one of rebaudioside O and rebaudioside N as active ingredients. In addition, the sweetener composition is used in combination with an additional sweetener.

11 Claims, 1 Drawing Sheet

Sample 1 + 95% RA is a sample comprising sample 1 and 95% RA at a ratio of 2:1.
RA is rebaudioside A.
RM is rebaudioside M.
RD is rebaudioside D.
RN is rebaudioside N.
RO is rebaudioside O.

(56) References Cited

U.S. PATENT DOCUMENTS

2015/0017284 A1        1/2015   Prakash et al.
2015/0031869 A1        1/2015   Markosyan et al.
2016/0058053 A1*       3/2016   Markosyan ............. A23L 27/36
                                                          426/431

FOREIGN PATENT DOCUMENTS

| WO | WO-2013/096420 A1 |   | 6/2013  |            |           |
|----|-------------------|---|---------|------------|-----------|
| WO | 2013/102793 A2    | † | 7/2013  |            |           |
| WO | WO-2013/102793 A2 |   | 7/2013  |            |           |
| WO | 2014/197898 A1    | † | 12/2014 |            |           |
| WO | WO-2014/197898 A1 |   | 12/2014 |            |           |
| WO | WO-2014197898 A1  | * | 12/2014 | ............. | A23G 3/346 |
| WO | 2015/023928 A1    | † | 2/2015  |            |           |

OTHER PUBLICATIONS

Communication in Cases for Which No Other Form is Applicable, International Application No. PCT/JP2016/001394, dated Feb. 8, 2017.
International Search Report, International Application No. PCT/JP2016/001394, dated Jun. 14, 2016.
Ohta et al., Characterization of novel steviol glycosides from leaves of Stevia rebaudiana morita, J. Appl. Glycosci., 57:199-209 (2010).
Third Party Observation, International Application No. PCT/JP2016/001394, Feb. 7, 2017.
Australian Patent Application No. 2016230587, Examination Report No. 2, dated Oct. 4, 2019.

\* cited by examiner
† cited by third party

Sample 1 + 95% RA is a sample comprising sample 1 and 95% RA at a ratio of 2:1.
RA is rebaudioside A.
RM is rebaudioside M.
RD is rebaudioside D.
RN is rebaudioside N.
RO is rebaudioside O.

SWEETENER COMPOSITION AND FOOD CONTAINING SAME

TECHNICAL FIELD

The present invention relates to a sweetener composition comprising a steviol glycoside and a food product comprising the same.

BACKGROUND ART

Stevia is a perennial plant of the sunflower family, native to Paraguay in South America, with a binomial name of Stevia Rebaudiana Bertoni. The primary component of stevia is stevioside, with 300-times the sweetness of sugar. Stevia comprises sweetness components such as rebaudioside A, rebaudioside C, rebaudioside D, rebaudioside E, and dulcoside A. These sweetness components are used as natural sweeteners.

While the main component of stevia, stevioside has long been known to exist and has been used as a sweetener, the application of stevioside was limited due to residual unpleasant aftertaste such as bitterness when used as a sweetener. In contrast, rebaudioside A, which is contained in stevia as a secondary sweetness component, has high quality sweetness with less bitterness than stevioside and 1.3 to 1.5 times the sweetness of stevioside. Accordingly, there is a demand for a stevia sweetener comprising more rebaudioside A than stevioside. The inventors developed a stevia variety (Stevia Rebaudiana Bertoni Morita) having rebaudioside A as the primary component and stevioside as a secondary component by crossbreeding of repeatedly crossing and selecting from conventional varieties, and developed a rebaudioside sweetener from such a stevia variety (Patent Literatures 1 and 2).

The quality of sweetness of a sweetener is compared to the quality of sweetness of sugar, such that creation of a sweetener with quality of sweetness that is close to the quality of sweetness of sugar is desired. Various attempts have been made to create a sweetener with quality of sweetness that is close to the quality of sweetness of sugar using a sweetener that can sufficiently satisfy consumers, but none of the attempts have led to an excellent sugar substitute sweetener to be provided. For example, combined use of a rebaudioside A sweetener with an artificial sweetener with a high level of sweetness such as sucralose or acesulfame K does not meet the preference of consumers demanding of a natural sweetener. Further, combined use of a rebaudioside A sweetener with sugar, sugar alcohol, and the like has issues, such as high calories or induction of diarrhea symptoms. Furthermore, combined use of a rebaudioside A sweetener with a masking agent such as a flavoring has issues, i.e., masking the sweetness itself of the rebaudioside A sweetener. Attempts have been made to increase the purity of rebaudioside A to improve the quality of taste, but such attempts have not led to a sweetener with sufficiently improved quality of sweetness.

Recently, novel steviol glycosides have been discovered as a sweetness component contained in Stevia Rebaudiana Bertoni Morita (Patent Literature 3). All such steviol glycosides have sufficient quality of sweetness for use as a sugar substitute sweetener, but only a small amount is contained in the plant such that practical application thereof was difficult in terms of cost. In view of the above, there is a demand for an excellent natural sweetener with quality of sweetness that is close to the quality of sweetness of sugar.

CITATION LIST

Patent Literature

[PTL 1] Japanese Laid-Open Publication No. 2001-120218
[PTL 2] Japanese Laid-Open Publication No. 2012-090629
[PTL 3] Japanese Patent No. 5604426

SUMMARY OF INVENTION

Technical Problem

Stevia has been drawing attention as a natural sweetener, but the bitterness and aftertaste of the primary component thereof, stevioside, is problematic, such that improvement in the quality of taste has been demanded. The inventors have developed a sweetener with rebaudioside A as the primary component and are in development of a natural sweetener with reduced flavors of other components by increasing the purity of rebaudioside A. However, this has not led to the development of a natural sweetener with sufficiently improved quality of sweetness for use in food products.

The objective of the present invention is to provide a sweetener composition with quality of sweetness that is close to the quality of sweetness of sugar, which can be used in food products, and food products comprising the same.

Another objective of the present invention is to improve the quality of taste of rebaudioside A.

Solution to Problem

As a result of diligent research to solve the above-described problems, the inventors have discovered that a specific combination of several varieties of steviol glycosides can be used on its own in food products as an excellent sweetener, and the specific combination thereof has an effect of improving the quality of taste and/or an effect of masking bitterness. The inventors have completed the present invention by discovering that an addition of a specific combination of such steviol glycosides to a sweetener (e.g., rebaudioside A) can improve the quality of sweetness of the sweetener and mask the bitterness of rebaudioside A, which was considered to have a residual bitterness, to attain excellent quality of sweetness that can be used in food products.

The present invention is a sweetener composition comprising rebaudioside O and/or rebaudioside N.

The present invention is a sweetener composition, wherein rebaudioside O content is 1 to 98% by weight, rebaudioside N content is 1 to 98% by weight, and total rebaudioside O and rebaudioside N content is 2 to 99% by weight.

The present invention is a sweetener composition comprising at least one of rebaudioside D and rebaudioside M and at least one of rebaudioside O and rebaudioside N.

The present invention is a sweetener composition, wherein rebaudioside D content is 0 to 98% by weight, rebaudioside M content is 0 to 98% by weight, rebaudioside O content is 0 to 99% by weight, and rebaudioside N content is 0 to 99% by weight, and total rebaudioside D, rebaudioside M, rebaudioside O, and rebaudioside N content is 1 to 99% by weight.

The present invention is a sweetener composition, wherein at least one of rebaudioside D, rebaudioside M, rebaudioside O, and rebaudioside N is obtained from a stevia extract.

The present invention is a sweetener composition, wherein at least one of rebaudioside D, rebaudioside M, rebaudioside O, and rebaudioside N is obtained by purifying a stevia extract with hydrophilic alcohol.

The present invention is a sweetener composition further comprising a sweetener.

The present invention is a sweetener composition, wherein a ratio of a weight of a sweetener and a weight of the sweetener composition excluding the sweetener is 1:0.01 to 1:200.

The present invention is a sweetener composition, wherein the sweetener comprises rebaudioside A.

The present invention is a sweetener composition added to a steviol glycoside.

The present invention is a sweetener composition, wherein a ratio of a weight of the steviol glycoside and a weight of the sweetener composition excluding the steviol glycoside is 1:0.01 to 1:17.

The present invention is a sweetener composition, wherein a steviol glycoside comprises rebaudioside A.

The present invention is a sweetener composition, wherein sweetener or rebaudioside A content in a steviol glycoside is 74 to 98% by weight.

The present invention is a food product comprising a sweetener composition.

The present invention is a food product, wherein the content of a sweetener composition is 0.0001 to 2.0% by weight.

The present invention is a bitterness masking flavor, wherein a ratio of a weight of a sweetener and a weight of a sweetener composition is 1:0.01 to 1:99.

The present invention is a flavor enhancer, wherein a ratio of a weight of a sweetener and a weight of a sweetener composition is 1:0.01 to 1:99.

The present invention is a bitterness masking agent, wherein a ratio of a weight of a sweetener and a weight of a sweetener composition is 1:0.01 to 1:99.

In one embodiment, the present invention is a sweetener composition characterized by comprising rebaudioside O and rebaudioside N.

In one embodiment, the sweetener composition of the invention is characterized in that rebaudioside O content is 1 to 98% by weight and rebaudioside N content is 1 to 98% by weight, and total rebaudioside O and rebaudioside N content is 2 to 99% by weight.

In one embodiment, the sweetener composition of the invention is characterized by comprising more rebaudioside O than rebaudioside N.

In one embodiment, the sweetener composition of the invention is characterized by comprising at least one of rebaudioside D and rebaudioside M and at least one of rebaudioside O and rebaudioside N.

In one embodiment, the sweetener composition of the invention is characterized in that rebaudioside D content is 0 to 98% by weight, rebaudioside M content is 0 to 98% by weight, rebaudioside O content is 0 to 99% by weight, and rebaudioside N content is 0 to 99% by weight, and total rebaudioside D, rebaudioside M, rebaudioside O, and rebaudioside N content is 1 to 99% by weight.

In one embodiment, the sweetener composition of the invention comprises rebaudioside D and rebaudioside N, characterized by comprising more rebaudioside N than rebaudioside D.

In one embodiment, the sweetener composition of the invention comprises rebaudioside O and rebaudioside D, characterized by comprising a greater amount of rebaudioside O than rebaudioside D.

In one embodiment, the sweetener composition of the invention comprises rebaudioside O and rebaudioside M, characterized by comprising a greater amount of rebaudioside O than rebaudioside M.

In one embodiment, the sweetener composition of the invention is a composition wherein at least one of rebaudioside D, rebaudioside M, rebaudioside O, and rebaudioside N is a stevia extract.

In one embodiment, the sweetener composition of the invention is characterized in that at least one of rebaudioside D, rebaudioside M, rebaudioside O, and rebaudioside N is obtained by purification with hydrophilic alcohol.

In one embodiment, the present invention is a composition comprising the claimed sweetener composition and an addition sweetener.

In one embodiment, the composition of the invention is characterized in that a ratio of a weight of an additional sweetener and a weight of a sweetener composition is 1:0.01 to 1:200.

In one embodiment, the composition of the invention is characterized in that an additional sweetener comprises rebaudioside A.

In one embodiment, the composition of the invention is characterized in that the content of rebaudioside A is 74 to 98% by weight.

In one embodiment, the present invention is a food product characterized by comprising the claimed sweetener composition or the claimed composition.

In one embodiment, the food product of the invention is characterized in that the content of the claimed sweetener composition is 0.0001 to 2.0% by weight.

In one embodiment, the food product of the invention is characterized in that the content of the claimed sweetener composition is 0.005 to 0.3% by weight.

In one embodiment, the food product of the invention is characterized in that the content of the claimed sweetener composition is 0.01 to 0.1% by weight.

In one embodiment, the sweetener composition of the invention is a taste improving agent of rebaudioside A.

In one embodiment, the sweetener composition of the invention is a bitterness masking agent of rebaudioside A.

In one embodiment, the present invention is a bitterness masking flavor, characterized by comprising an additional sweetener and the claimed sweetener composition at a weight ratio of 1:0.01 to 1:99.

In one embodiment, the present invention is a flavor enhancer, characterized by comprising an additional sweetener and the claimed sweetener composition at a weight ratio of 1:0.01 to 1:99.

Advantageous Effects of the Invention

The present invention provides an excellent sugar substitute sweetener composition comprising a specific combination of natural sweetness components. This sweetener composition can not only be used in food products on its own as an excellent sweetener, but also improve the quality of sweetness of another sweetener when used in combination with another sweetener and/or mask bitterness. Combined use of the sweetener composition of the invention and another sweetener can attain excellent quality of sweetness that can be used in food products.

When the sweetener composition of the invention is added to a mass-distributed rebaudioside A sweetener, quality of sweetness of the rebaudioside A sweetener can be significantly improved and/or mask bitterness. Thus, such a composition can be supplied to the market in large quantities as a better sugar substitute natural sweetener.

DESCRIPTION OF EMBODIMENTS

The present invention is explained hereinafter with exemplary Examples while referring to the appended drawings as needed. Throughout the entire specification, a singular expression should be understood as encompassing the concept thereof in the plural form, unless specifically noted otherwise. Further, the terms used herein should be understood as used in the meaning that is commonly used in the art, unless specifically noted otherwise. Thus, unless defined otherwise, all terminologies and scientific technical terms that are used herein have the same meaning as the general understanding of those skilled in the art to which the present invention pertains. In case of a contradiction, the present specification (including the definitions) takes precedence.

As used herein, "sweetener composition" refers to a composition comprising the following specific combinations of steviol glycosides:
*rebaudioside O and rebaudioside N
*rebaudioside O and rebaudioside D
*rebaudioside O and rebaudioside M
*rebaudioside N and rebaudioside D
*rebaudioside N and rebaudioside M In the present invention, the combination of rebaudioside M and O is especially preferable. This is because, when combined with an additional sweetener, not only bitterness is masked, but also smoothness and richness is enhanced in sweetness to improve the overall quality of sweetness of the additional sweetener.

As used herein, "additional sweetener", when referring to an "additional sweetener" in addition to a sweetener composition, is any sweetener other than the specific steviol glycoside contained in the sweetener composition. The additional sweetener can be any sweetener known in the art, but is preferably a natural sweetener, more preferably a steviol glycoside, and especially preferably rebaudioside A.

As used herein, "improvement in quality of sweetness" and "improvement in taste" are interchangeably used, referring to one or more of reduction of residual sweetness, reduction of bitterness, reduction of astringency, reduction of metallic taste, reduction of licorice taste, increase in richness, and expedited expression of sweetness.

The sweetener composition of the invention can achieve improvement in the quality of sweetness of an additional sweetener, particularly a significant effect of reducing (masking) bitterness.

As used herein, "sweetness quality improving agent" and "taste improving agent" are interchangeably used, referring to any substance that exerts an effect of improvement in the quality of sweetness or improvement in taste when added to a food product, relative to a food product without such a substance. The inventors have discovered that rebaudioside O is an excellent sweetness quality improving agent not only as a combination but also on its own. Rebaudioside O exerts an excellent effect of improving the quality of sweetness and/or an effect of masking bitterness especially on rebaudioside A.

As used herein, "bitterness masking flavor" refers to any substance that masks the bitterness in a food product and improves the flavor or savor when added to a food product, relative to a food product without such a substance.

As used herein, "flavor enhancer" refers to any substance that enhances the flavor or savor of a food product when added to a food product, relative to a food product without such a substance.

The sweetener composition of the invention comprises rebaudioside O and/or rebaudioside N.

In the sweetener composition of the invention, rebaudioside O content is 1 to 98% by weight, rebaudioside N content is 1 to 98% by weight, and total rebaudioside O and rebaudioside N content is 2 to 99% by weight. Preferably, rebaudioside O content is 10 to 60% by weight, and rebaudioside N content is 10 to 60% by weight. More preferably, rebaudioside O content is 30 to 40% by weight, and rebaudioside N content is 30 to 40% by weight. In a preferred embodiment, the sweetener composition of the invention comprises more rebaudioside O than rebaudioside N by % by weight. Specifically, in the sweetener composition of the invention, rebaudioside O content (% by weight) is 110% or greater, 120% or greater, 150% or greater, 200% or greater, 300% or greater, 500% or greater, 700% or 900% or greater of rebaudioside N content (% by weight).

In one embodiment of the present invention, the sweetener composition of the invention comprises at least one of rebaudioside D and rebaudioside M, and at least one of rebaudioside O and rebaudioside N. Preferably, the sweetener composition of the invention comprises rebaudioside D, rebaudioside M, rebaudioside O, and rebaudioside N.

Rebaudioside D, rebaudioside M, rebaudioside O, and rebaudioside N content in the sweetener composition of the invention is not particularly limited. For example, rebaudioside D content is 0 to 98% by weight, rebaudioside M content is 0 to 98% by weight, rebaudioside O content is 0 to 99% by weight, and rebaudioside N content is 0 to 99% by weight. Preferably, rebaudioside D content is 10 to 60% by weight, rebaudioside M content is 20 to 80% by weight, rebaudioside O content is 10 to 60% by weight, and rebaudioside N content is 10 to 60% by weight. More preferably, rebaudioside D content is 10 to 30% by weight, rebaudioside M content is 30 to 40% by weight, rebaudioside content is 30 to 40% by weight, and rebaudioside N content is 30 to 40% by weight. Total rebaudioside D, rebaudioside M, rebaudioside O, and rebaudioside N content in the sweetener composition of the invention is 1 to 99% by weight, preferably 10 to 99% by weight, and more preferably 20 to 99% by weight.

In one embodiment, the sweetener composition of the invention comprises rebaudioside D and rebaudioside N, and preferably comprises more rebaudioside N than rebaudioside D by % by weight. Specifically, rebaudioside N content (% by weight) in the sweetener composition of the invention is 110% or greater, 120% or greater, 150% or greater, 200% or greater, 300% or greater, 500% or greater, 700% or 900% or greater of rebaudioside D content (% by weight).

In another embodiment, the sweetener composition of the invention comprises rebaudioside O and rebaudioside D, and preferably comprises more rebaudioside O than rebaudioside D by % by weight. Specifically, rebaudioside O content (% by weight) in the sweetener composition of the invention is 110% or greater, 120% or greater, 150% or greater, 200% or greater, 300% or greater, 500% or greater, 700% or 900% or greater of rebaudioside D content (% by weight).

In another embodiment, the sweetener composition of the invention comprises rebaudioside O and rebaudioside M, and preferably comprises more rebaudioside O than rebaudioside M by % by weight. Specifically, rebaudioside O content (% by weight) in the sweetener composition of the invention is 110% or greater, 120% or greater, 150% or greater, 200% or greater, 300% or greater, 500% or greater, 700% or 900% or greater of rebaudioside M content (% by weight).

In another embodiment, the sweetener composition of the invention comprises rebaudioside M and rebaudioside N, and preferably comprises more rebaudioside N than rebaudioside M by % by weight. Specifically, rebaudioside N content (% by weight) in the sweetener composition of the invention is 110% or greater, 120% or greater, 150% or greater, 200% or greater, 300% or greater, 500% or greater, 700% or 900% or greater of rebaudioside M content (% by weight).

Rebaudioside D, rebaudioside M, rebaudioside O, and rebaudioside N may be obtained by any method. For example, at least one of rebaudioside D, rebaudioside M, rebaudioside O, and rebaudioside N may be obtained as a stevia extract. Specifically, rebaudioside D, rebaudioside M, rebaudioside O, and rebaudioside N may be obtained from an extract prepared by selecting a stevia variety comprising these sweetness components, extracting stevia dried leaves with water or hydrophilic solvent, bleaching and then concentrating with a known purification method and drying the concentrate, or obtained from crystallizing an extract with ethanol, methanol or the like and removing rebaudioside A and stevioside with impurities, and further concentrating and drying the resultant substance. Any method may be used as the method of removing rebaudioside A, stevioside, and impurities.

Rebaudioside D, rebaudioside M, rebaudioside O, and rebaudioside N may each be isolated, or obtained as a stevia extract in a state where rebaudioside O and rebaudioside N coexist, or in a state where at least one of rebaudioside D and rebaudioside M and at least one of rebaudioside O and rebaudioside N coexist. From an economic viewpoint such as the cost of isolating each component or isolation efficiency, it may be preferable to obtain coexisting multiple components.

In one embodiment of the present invention, at least one of rebaudioside D, rebaudioside M, rebaudioside O, and rebaudioside N may be obtained by recrystallizing a stevia extract with hydrophilic alcohol. For example, methanol or ethanol can be used as hydrophilic alcohol.

In one embodiment of the present invention, the present invention may be a composition comprising an additional sweetener in addition to the sweetener composition of the invention. The sweetener composition of the invention can not only have excellent quality of sweetness on its own, but also improve the quality of sweetness of another additional sweetener, especially/or mask bitterness. Thus, the sweetener composition of the invention can also be used as a taste improving agent for a sweetener. The composition of the invention comprising a sweetener composition and an additional sweetener has a better quality of sweeteness. The additional sweetener may be, but is not limited to, one or more natural sweeteners selected from stevioside, rebaudioside A, rebaudioside B, rebaudioside C, rebaudioside E, rebaudioside F, rebaudioside G, rebaudioside H, rebaudioside I, rebaudioside J, rebaudioside K, rebaudioside L, dulcoside A, dulcoside B, steviolbioside, steviolmonoside, rubusoside, glycyrrhizic acid and salts thereof, mogroside IV, mogroside V, *Momordica grosvenori*, cyamenoside, monatin and salts thereof, curculin, thaumatin, monellin, mabinlin, brazzein, hernandulcin, phyllodulcin, glycyphyllin, phlorizin, trilobatin, baiyunoside, osladine, polypodoside A, pterocaryoside A, pterocaryoside B, mukurozioside, phlomisoside I, periandrin I, abrusoside A, cyclocaryoside I, and the like. The sweetener composition of the invention can improve the quality of sweetness and especially/or mask bitterness of especially rebaudioside A.

A sweetness component of a sweetener composition used in combination with a sweetener may be rebaudioside O and rebaudioside N, or a combination of at least one of rebaudioside D and rebaudioside M and at least one of rebaudioside O and rebaudioside N. For example, the quality of sweetness of a sweetener can be improved for excellent quality of sweetness by combined use of a sweetener with rebaudioside D and one or more of rebaudioside O and rebaudioside N. Preferably, a sweetener is used in combination with rebaudioside D and rebaudioside M, and one or more of rebaudioside O and rebaudioside N. Further, smoothness and richness can be imparted to the sweetness of a sweetener when a sweetener is used in combination with one or more of rebaudioside D and rebaudioside M, and rebaudioside O and rebaudioside N.

In a preferred embodiment, the sweetener composition of the invention is a combination of rebaudioside M and rebaudioside O.

Rebaudioside D, rebaudioside M, rebaudioside O, and rebaudioside N content in a sweetener composition used in combination with a sweetener is not particularly limited, but the content within the aforementioned range can result in an effect of improving the quality of sweetness of an additional sweetener.

The ratio of the weight of an additional sweetener and the weight of a sweetener composition is not particularly limited, but is 1:0.01 to 1:99, preferably 1:0.1 to 1:99, and more preferably 1:0.2 to 1:99.

A significant effect of improving the quality of sweetness of an additional sweetener is not attained from adding less than 0.01 parts by weight of sweetener composition to 1 part by weight of an additional sweetener, but a significant effect of improving the quality of sweetness of a sweetener is attained by adding 0.01 parts by weight or more of a sweetener composition to 1 part by weight of an additional sweetener. The effect of improving the quality of sweetness of a sweetener can be enhanced by increasing the amount of sweetener composition added to 1 part by weight of a sweetener from 0.01 parts by weight.

In one embodiment of the present invention, an additional sweetener may comprise rebaudioside A. The sweetener composition of the present invention can mask the bitterness of rebaudioside A in combined use of rebaudioside A. Alternatively/Additionally, the sweetener composition of the invention can attain an effect of improving the quality of sweetness, e.g., providing smoothness and/or richness to the sweetness of rebaudioside A. When the purity of rebaudioside A is low, a significant effect of improving the quality of taste is not attained. Thus, rebaudioside A subjected to a crystallization step is preferable. Rebaudioside A is preferably highly pure rebaudioside A. In the present invention, "highly pure rebaudioside A" refers to rebaudioside A with a purity of 75% or greater.

A sweetener composition used in combination with rebaudioside A may be rebaudioside O and rebaudioside N, or a combination of at least one of rebaudioside D and rebaudioside M and at least one of rebaudioside O and rebaudioside N. For example, a sweetener with excellent quality of sweetness can be obtained by using rebaudioside O and rebaudioside N in combination with rebaudioside A. Preferably, one or more of rebaudioside D and rebaudioside M and one of rebaudioside O and rebaudioside N are used in combination with rebaudioside A. Further, smoothness and richness are harmonized with the sweetness of rebaudioside A if one or more of rebaudioside D and rebaudioside M, and rebaudioside O and rebaudioside N are used in combination with rebaudioside A. Thus, the combination of rebaudioside M and rebaudioside O is especially preferable in the sweetener composition of the invention.

The rebaudioside A content in a composition that is a combination of the sweetener composition of the invention and an additional sweetener is not particularly limited, but is 74 to 98% by weight, preferably 94 to 98% by weight, and more preferably 96 to 98% by weight. The rebaudioside A content in an additional sweetener is not particularly limited, but is 75% by weight or greater, preferably 90% by weight or greater, more preferably 95% by weight, and especially preferably 99% by weight or greater.

In one embodiment of the present invention, the sweetener composition of the invention may be added to a steviol glycoside. The rebaudioside D, rebaudioside M, rebaudioside O, and rebaudioside N content in a sweetener composition added to a steviol glycoside is not particularly limited, but an effect of improving the quality of sweetness of a steviol glycoside can be attained within the aforementioned range.

The ratio of the weight of a steviol glycoside and the weight of a sweetener composition excluding the steviol glycoside is not particularly limited, but is 1:0.01 to 1:17, preferably 1:0.2 to 1:17, and more preferably 1:1 to 1:17.

The steviol glycoside is not particularly limited, but rebaudioside A, rebaudioside B, rebaudioside C, rebaudioside E, rebaudioside F, stevioside or the like can be used. Enzyme-treated stevia can also be used.

In one embodiment of the present invention, a steviol glycoside may comprise rebaudioside A. The rebaudioside A content in a composition comprising the sweetener composition of the invention and a steviol glycoside as an additional sweetener is not particularly limited, but is 74 to 98% by weight, preferably 94 to 98% by weight, and more preferably 96 to 98% by weight. The rebaudioside A content in a steviol glycoside as an additional sweetener is not particularly limited, but is 75% by weight or greater, preferably 90% by weight or greater, more preferably 95% by weight, and especially preferably 99% by weight or greater.

The food product of the invention is characterized by comprising the sweetener composition of the invention. The sweetener composition of the invention has excellent quality of sweetness and exerts an effect of improving the quality of sweetness of an additional sweetener. Thus, the sweetener composition of the invention can be used in all food products in which said additional sweetener is used. Specifically, the sweetener composition of the invention can be used in, but is not limited to, candies, jelly, drinking water, cold desserts, powdered beverages, instant noodles, jam, chewing gum, Japanese confectionaries, functional food, chocolates, table-top sweeteners, baked confectionaries, delicacies, water kneaded food products, yogurt, lactic acid bacteria fermented beverages, lactic acid beverages, coffee beverages, cocoa beverages, tea beverages, liqueur, wine, sherbet, cereal food products, vegetable fiber-containing food products, dried fruits, sauce, soy sauce, miso, vinegar, dressing, mayonnaise, ketchup, curry, soup, beika, arare, bread, biscuits, crackers, pancake batter, canned fruits, canned vegetables, vegetable juice, meat products, fish paste products, seafood, salted food products, pickles, artificial seasoning, food products consumed for taste, flavor, or stimulant effect, and the like. The food product of the invention comprises the sweetener composition of the invention, so that the effect of reduced calories, reduced sugar, lowered melting point, improved quality of sweetness and/or masked bitterness can be attained.

Furthermore, to enhance the economic effect, the sweetener composition of the invention can be added to a food product with one or more high-intensity artificial sweeteners selected from saccharin and salts thereof, cyclamic acid and salts thereof, sucralose, acesulfamic acid and salts thereof, aspartame, neotame, alitame neohesperidin dihydrochalcone, cyclamate, advantame, glycosylated steviol glycoside and the like. For consumers who are accustomed to the taste of sugar, the sweetener composition of the invention can be added to a food product with natural sugar such as sugar, fructose, glucose, isomerized sugar, rare sugar, erythritol, maltitol, sorbitol, lactitol, mannitol, xylitol, tagatose, rhamnose, cyclodextrin, threose, galactose, ribulose, arabinose, xylose, allose, mannose, altrose, idose, lactose, maltose, trehalose, isotrehalose, neotrehalose, palatinose, psicose, turanose, cellobiose, glucosamine, fucose, gluconic acid, glucuronic acid, and the like, or added to a food product with a sugar alcohol such as erythritol or sorbitol. The sweetener composition of the invention can also be added to a food product with a diluent.

The content of the sweetener composition of the invention in the food product of the invention is not particularly limited, but is 0.0001 to 2.0% by weight, 0.001 to 2.0% by weight, 0.004 to 2.0% by weight, preferably 0.005 to 0.3% by weight, and more preferably 0.01 to 0.1% by weight.

In one embodiment, the content of a composition comprising the sweetener composition of the invention and an additional sweetener in a food product is not particularly limited, but is 0.0001 to 2.0% by weight, 0.001 to 2.0% by weight, 0.004 to 2.0% by weight, preferably 0.005 to 0.3% by weight, and more preferably 0.01 to 0.1% by weight. The ratio of the weight of sweetener composition and the weight of additional sweetener in the above-described composition is 0.01:1 to 200:1, preferably 0.1:1 to 200:1, more preferably 0.2:1 to 200:1, 1:1 to 200:1, and especially preferably 5:1 to 200:1 or 10:1 to 200:1.

Further, the sweetener composition of the invention can be used in a cosmetic product, medicine, or the like.

The sweetener composition of the invention can be used in combination with a sweetener as a bitterness masking flavor. The ratio of the weight of sweetener and the weight of sweetener composition in the bitterness masking flavor of the invention is preferably 1:0.01 to 1:99.

The sweetener composition of the invention can be used in combination with a sweetener as a flavor enhancer. The ratio of the weight of sweetener and the weight of sweetener composition in the flavor enhancer of the invention is preferably 1:0.01 to 1:99.

The sweetener composition of the invention can be used in combination with a sweetener as a bitterness masking agent. The ratio of the weight of sweetener and the weight of sweetener composition in the bitterness masking agent of the invention is preferably 1:0.01 to 1:99.

EXAMPLES

The present invention is explained hereinafter in more detail with the Examples, but the present invention is not limited to these Examples.

Example 1

An extract was obtained by extracting three times from 1000 g of dried stevia leaves with 15-fold volume of warm water. The resulting extract was passed through a column filled with 1000 ml of nonpolar absorbent resin (Diaion HP20, Mitsubishi Chemical Corporation) and washed with water. Ethanol was then used to elute out a sweetness component, and the eluent was subsequently subjected to vacuum concentration to remove alcohol. The concentrate was diluted with water so that solids would be about 4%. The mixture was passed through a column filled with 200 ml of a cation exchange resin (Diaion PA408, Mitsubishi Chemical Corporation) and a column filled with 200 ml of an anion exchange resin (Diaion WA30, Mitsubishi Chemical Corporation) and bleached. The bleached solution was subjected to reduced pressure to concentrate the solution until solids were about 30%, and the solution was dried with a vacuum drier to provide 105 g of powder (powder a).

Example 2

Powder a obtained in Example 1 contained 65% by weight of rebaudioside A, 11% by weight of stevioside, and 8% by weight of rebaudioside C. After the powder was heated and dissolved in 10-fold volume of 90% ethanol, the solution was cooled to 4° C. and was left standing for 24 hours. The resulting crystal after leaving the solution standing (90% by weight of rebaudioside A, 4% by weight of stevioside, and 1% by weight of rebaudioside C) was separated and removed.

Example 3

The mother liquor separated in Example 2 was subjected to vacuum concentration. Water was added so that the solids after concentration would be about 4%. The mixture was again passed through a column filled with nonpolar absorbent resin, a column filled with a cation exchange resin and a column filled with an anion exchange resin, and was concentrated and dried. After drying, the operation of crystallization and the removal of the crystal was repeated three times. Furthermore, after adding activated carbon, filtration was conducted. The filtrate was again passed through a column filled with nonpolar absorbent resin, a column filled with a cation exchange resin and a column filled with an anion exchange rein, and was concentrated and dried. The final separated mother liquor, which was obtained by repeating the same procedure until rebaudioside A, stevioside, or the like could no longer be removed, was concentrated and dried to provide 8.5 g of powder comprising a steviol glycoside (sample 1).

The components of the resulting sample 1 were analyzed with high performance liquid chromatography. The following are the results of analysis.

| | |
|---|---|
| Rebaudioside O | 11% by weight |
| Rebaudioside N | 10% by weight |
| Rebaudioside D | 22% by weight |
| Rebaudioside M | 11% by weight |

The method of purifying and separating sample 1 is not limited to the aforementioned method. Any method may be used as long as the method is a purification method that can remove rebaudioside A and stevioside and keep rebaudioside D, rebaudioside M, rebaudioside O, and rebaudioside N on the mother liquor side.

(Confirmation Method)

Figure 1:
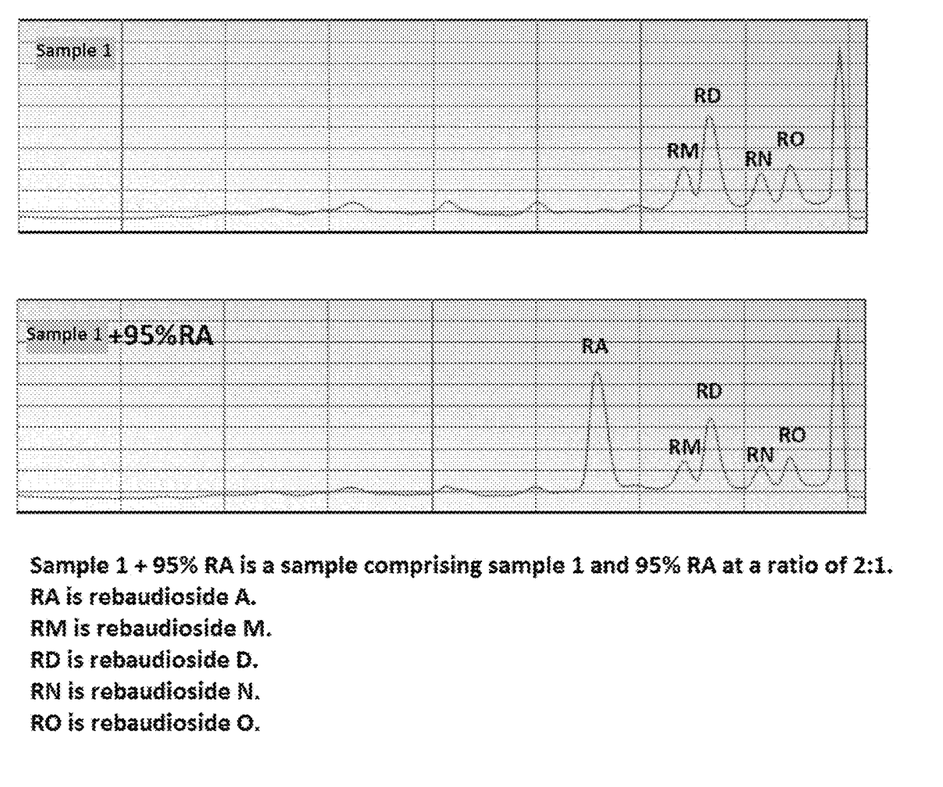
FIG. 1 shows graphs of results of a thin-layer chromatography performed on sample 1 in Example 3.

Thin-layer chromatography was performed to confirm that rebaudioside D, rebaudioside M, rebaudioside O, and rebaudioside N were present as primary components, and rebaudioside A and stevioside were present at a minute amount in sample 1. The results are shown in FIG. 1. In FIG. 1, sample 1+95% RA represents a sample comprising sample 1 and 95% RA at a ratio of 2:1, RA represents rebaudioside A, RM represents rebaudioside M, RD represents rebaudioside D, RN represents rebaudioside N, and RO represents rebaudioside O.

| | |
|---|---|
| Development condition | 25° C. |
| TLC | Silica gel 60 |
| Development solvent | Chloroform:methanol:water = 60:40:8 |
| Coloring method | 50% sulfuric acid |
| Confirmation | FIG. 1 |

Example 4

In addition to powder a obtained in Example 1, powder b (75% by weight of rebaudioside A, 8% by weight of stevioside, and 2% by weight of rebaudioside C), powder c (95% by weight of rebaudioside A and 1% by weight of stevioside), and powder d (99% by weight of rebaudioside A) were additionally prepared. To 1 part by weight of powders a to d, 0.005 parts by weight to 99 parts by weight of sample 1 were added to prepare a 0.1% by weight aqueous solution. The effect of improving the quality of sweetness of rebaudioside A was examined for powders a to d by a 10 panelists who have expertise in the quality of sweetness of stevia. Since the effect of masking bitterness is the strongest among the effects of improving the quality of sweetness, the effect of improving the quality of sweetness was comprehensively judged for only samples achieving an effect of masking bitterness. Samples without an effect of masking bitterness were considered to have no effect. The following Table 1 shows the results. The numbers 0 to 10 in Table 1 indicate the number of panelists deeming that there was an effect of improving the quality of sweetness and effect of masking bitterness.

TABLE 1

| | Sample 1 | | | | | | |
|---|---|---|---|---|---|---|---|
| | 0.005 parts | 0.01 parts | 0.1 parts | 0.2 parts | 1 part | 10 parts | 99 parts |
| Powder a | 0 | 0 | 0 | 1 | 1 | 8 | 10 |
| Powder b | 0 | 6 | 6 | 6 | 10 | 10 | 10 |
| Powder c | 1 | 6 | 7 | 7 | 10 | 10 | 10 |
| Powder d | 2 | 6 | 8 | 9 | 10 | 10 | 10 |

An effect of improving the quality of sweetness and an effect of masking bitterness by adding sample 1 to powder a were hardly detected. However, when sample 1 was added to powders b to d, an effect of improving the quality of sweetness and an effect of masking bitterness were able to be detected upon addition of sample 1 at 0.01 parts by weight or greater.

Example 5

7.0 g of sample 1 obtained in Example 3 was heated and dissolved into 40 ml of ethanol and was left standing for 24 hours at 4° C. The resulting crystal was separated and dried with a vacuum dryer to yield 3.91 g of white crystals (sample 2).

The components of resulting sample 2 were analyzed with high performance liquid chromatography as in Example 1. The following are the results of the analysis.

| | |
|---|---|
| Rebaudioside O | 21% by weight |
| Rebaudioside N | 19% by weight |
| Rebaudioside D | 33% by weight |
| Rebaudioside M | 9% by weight |

Example 6

An effect of improving the quality of sweetness and an effect of masking bitterness of sample 2 were examined as in Example 4. The following Table 2 shows the results. The numbers 0 to 10 in Table 2 indicate the number of panelists deeming that there was an effect of improving the quality of sweetness and effect of masking bitterness.

TABLE 2

| | Sample 2 | | | | | | |
|---|---|---|---|---|---|---|---|
| | 0.005 parts | 0.01 parts | 0.1 parts | 0.2 parts | 1 part | 10 parts | 99 parts |
| Powder a | 0 | 0 | 1 | 2 | 10 | 10 | 10 |
| Powder b | 0 | 6 | 7 | 6 | 10 | 10 | 10 |
| Powder c | 2 | 6 | 8 | 7 | 10 | 10 | 10 |
| Powder d | 2 | 7 | 8 | 9 | 10 | 10 | 10 |

An effect of improving the quality of sweetness and an effect of masking bitterness by adding sample 2 to powder a were hardly detected. However, when sample 2 was added to powders b to d, an effect of improving the quality of sweetness and an effect of masking bitterness were able to be detected upon addition of sample 2 at 0.01 parts by weight or greater.

Example 7

2.0 g of sample 2 obtained in Example 5 was passed through a column filled with an absorbent resin several times. Crystallization was repeated to separate each of the steviol glycosides, rebaudioside O, rebaudioside N, rebaudioside D, and rebaudioside M, which were dried with a vacuum dryer to yield 0.42 g, 0.38 g, 0.65 g, and 0.18 g of white crystals (samples 3, 4, 5, and 6), respectively.

The components of resulting samples 3, 4, 5, and 6 were analyzed with high performance liquid chromatography as in Example 1. The following are the results of analysis.

| | | |
|---|---|---|
| Sample 3 | rebaudioside O | 99% by weight |
| Sample 4 | rebaudioside N | 99% by weight |
| Sample 5 | rebaudioside D | 99% by weight |
| Sample 6 | rebaudioside M | 99% by weight |

Example 8

An effect of improving the quality of sweetness and an effect of masking bitterness of a sample (sample 7) comprising samples 3 and 4 obtained in Example 7 at 99:1 were examined as in Example 4. The following Table 3 shows the results. The numbers 0 to 10 in Table 3 indicate the number of panelists deeming that there was an effect of improving the quality of sweetness and an effect of masking bitterness.

TABLE 3

| | Sample 7 | | | | | | |
|---|---|---|---|---|---|---|---|
| | 0.005 parts | 0.01 parts | 0.1 parts | 0.2 parts | 1 part | 10 parts | 99 parts |
| Powder a | 0 | 0 | 0 | 0 | 1 | 8 | 10 |
| Powder b | 0 | 6 | 6 | 6 | 8 | 9 | 10 |
| Powder c | 0 | 6 | 6 | 7 | 9 | 10 | 10 |
| Powder d | 0 | 6 | 6 | 7 | 10 | 10 | 10 |

An effect of improving the quality of sweetness and an effect of masking bitterness by adding sample 7 to powder a were hardly detected. However, when sample 7 was added to powders b to d, an effect of improving the quality of sweetness and an effect of masking bitterness were able to be detected upon addition of sample 7 at 0.01 parts by weight or greater.

Example 9

An effect of improving the quality of sweetness and an effect of masking bitterness of a sample (sample 8) comprising samples 4 and 6 obtained in Example 7 at 99:1 were examined as in Example 4. The following Table 4 shows the results. The numbers 0 to 10 in Table 4 indicate the number of panelists deeming that there was an effect of improving the quality of sweetness and an effect of masking bitterness.

TABLE 4

| | Sample 8 | | | | | | |
|---|---|---|---|---|---|---|---|
| | 0.005 parts | 0.01 parts | 0.1 parts | 0.2 parts | 1 part | 10 parts | 99 parts |
| Powder a | 0 | 0 | 0 | 0 | 1 | 7 | 10 |
| Powder b | 0 | 6 | 6 | 6 | 10 | 10 | 10 |
| Powder c | 0 | 6 | 7 | 7 | 10 | 10 | 10 |
| Powder d | 0 | 6 | 7 | 7 | 10 | 10 | 10 |

An effect of improving the quality of sweetness and an effect of masking bitterness by adding sample 8 to powder a were hardly detected. However, when sample 8 was added to powders b to d, an effect of improving the quality of sweetness and an effect of masking bitterness were able to be detected upon addition of sample 8 at 0.01 parts by weight or greater.

Example 10

An effect of improving the quality of sweetness and an effect of masking bitterness of a sample (sample 9) comprising samples 3 and 5 obtained in Example 7 at 1:99 were examined as in Example 4. The following Table 5 shows the results. The numbers 0 to 10 in Table 5 indicate the number of panelists deeming that there was an effect of improving the quality of sweetness and effect of masking bitterness.

TABLE 5

|  | Sample 9 | | | | | | |
| --- | --- | --- | --- | --- | --- | --- | --- |
|  | 0.005 parts | 0.01 parts | 0.1 parts | 0.2 parts | 1 part | 10 parts | 99 parts |
| Powder a | 0 | 0 | 0 | 1 | 2 | 9 | 10 |
| Powder b | 0 | 6 | 6 | 6 | 10 | 10 | 10 |
| Powder c | 0 | 6 | 7 | 7 | 10 | 10 | 10 |
| Powder d | 0 | 6 | 7 | 7 | 10 | 10 | 10 |

An effect of improving the quality of sweetness and an effect of masking bitterness by adding sample 9 to powder a were hardly detected. However, when sample 9 was added to powders b to d, an effect of improving the quality of sweetness and an effect of masking bitterness were able to be detected upon addition of sample 9 at 0.01 parts by weight or greater.

Example 11

0.005 to 99 parts of sample 2 was added to 1 part of *Momordica grosvenori* to examine the effect of improving the quality of sweetness and the effect of masking bitterness. The following Table 6 shows the results. The numbers 0 to 10 in Table 6 indicate the number of panelists deeming that there was an effect of improving the quality of sweetness and effect of masking bitterness.

TABLE 6

|  | Sample 2 | | | | | | |
| --- | --- | --- | --- | --- | --- | --- | --- |
|  | 0.005 parts | 0.01 parts | 0.1 parts | 0.2 parts | 1 part | 10 parts | 99 parts |
| *Momordica grosvenori* | 0 | 7 | 7 | 7 | 8 | 10 | 10 |

An effect of improving the quality of sweetness and an effect of masking bitterness by adding 0.005 parts by weight of sample 2 to 1 part by weight of *Momordica grosvenori* were hardly detected. However, an effect of improving the quality of sweetness and an effect of masking bitterness were able to be detected upon addition of sample 2 at 0.01 parts by weight or greater.

Example 12

To 1 part by weight of powders a to d, 1 part by weight of sample 3 was added to prepare a 0.1% by weight aqueous solution. The effect of sample 3 on rebaudioside A to improve the quality of sweetness was examined by 10 panelists who have expertise in the quality of sweetness of stevia. The following Table 7 shows the results. The numbers 0 to 10 in Table 7 indicate the number of panelists deeming that there was an effect of improving the quality of sweetness and effect of masking bitterness.

TABLE 7

|  | Sample 3 (1 part by weight) | | | | |
| --- | --- | --- | --- | --- | --- |
| Number of panelists | No effect | Slightly effective | Somewhat effective | Effective | Significantly effective |
| Powder a (1 part by weight) | 0 | 3 | 7 | 0 | 0 |
| Powder b (1 part by weight) | 0 | 1 | 6 | 3 | 0 |
| Powder c (1 part by weight) | 0 | 0 | 0 | 1 | 9 |
| Powder d (1 part by weight) | 0 | 0 | 0 | 0 | 10 |

A significant effect of sample 3 (rebaudioside O) on rebaudioside A to improve the quality of sweetness (especially the effect of masking bitterness) was observed for rebaudioside A with a higher purity.

Example 13

To 1 part by weight of powder c used in Example 4, 0.01 to 10 parts by weight of sample 3 (rebaudioside O), sample (rebaudioside N), a 90:10 mixture of sample 3 and sample 4, or a 10:90 mixture of sample 3 and sample 4 was added to prepare a 0.1% by weight aqueous solution. These 4 samples were examined for an effect of improving the quality of sweetness on rebaudioside A by 10 panelists who have expertise in the quality of sweetness of stevia. The effect was also evaluated by points. The following Tables 8 and 9 show the results.

The numbers 0 to 10 in Table 8 indicate the number of panelists deeming that there was an effect of improving the quality of sweetness.

The numbers in Table 9 are total points from each panelist. Each panelist gave 0 points when the panelist felt that there was no effect. The samples that the panelist felt had an effect after comparing the samples, under the condition of same parts by weight (concentration) for the added samples, were given points, one point to the sample with the weakest effect, and then 2, 3, and 4 points in order of the weakness of effects.

TABLE 8

| Results of evaluation by number of panelists | | | | | | |
| --- | --- | --- | --- | --- | --- | --- |
|  | To 1 part by weight of powder c | | | | | |
| Number of panelists | 0.01 parts | 0.1 parts | 0.2 parts | 1 part | 5 parts | 10 parts |
| Sample 3 | 6 | 8 | 8 | 10 | 10 | 9 |
| Sample 4 | 5 | 6 | 6 | 10 | 10 | 6 |
| Sample 3:Sample 4 = 90:10 | 8 | 10 | 10 | 10 | 10 | 10 |
| Sample 3:Sample 4 = 10:90 | 6 | 9 | 10 | 10 | 10 | 10 |

TABLE 9

Results of evaluation by points

| Points | To 1 part by weight of powder c | | | | | |
|---|---|---|---|---|---|---|
| | 0.01 parts | 0.1 parts | 0.2 parts | 1 part | 5 parts | 10 parts |
| Sample 3 | 13 | 16 | 18 | 20 | 20 | 15 |
| Sample 4 | 5 | 6 | 6 | 10 | 10 | 6 |
| Sample 3:Sample 4 = 90:10 | 25 | 33 | 33 | 40 | 40 | 35 |
| Sample 3:Sample 4 = 10:90 | 15 | 21 | 21 | 30 | 30 | 25 |

This test confirmed that rebaudioside O and rebaudioside N attain a significantly better effect of improving the quality of sweetness of rebaudioside A (especially the effect of masking bitterness) when used in combination, relative to cases where they are used independently. It appeared that the amount of rebaudioside O is preferably greater than that of rebaudioside N in a combination of rebaudioside O and rebaudioside N.

Example 14

To 1 part by weight of powder c used in Example 4, 0.01 to 10 parts by weight of sample 4 (rebaudioside N), sample (rebaudioside D), a 90:10 mixture of sample 5 and sample 4, or a 10:90 mixture of sample 5 and sample 4 were added to prepare a 0.1% by weight aqueous solution. These samples were evaluated for the effect of improving the quality of sweetness on rebaudioside A as in Example 13 by the number of panelists and points.

TABLE 10

| Number of panelists | To 1 part by weight of powder c | | | | | |
|---|---|---|---|---|---|---|
| | 0.01 parts | 0.1 parts | 0.2 parts | 1 part | 5 parts | 10 parts |
| Sample 4 | 3 | 6 | 6 | 10 | 10 | 6 |
| Sample 5 | 0 | 2 | 4 | 10 | 6 | 2 |
| Sample 5:Sample 4 = 90:10 | 4 | 8 | 9 | 10 | 10 | 7 |
| Sample 5:Sample 4 = 10:90 | 6 | 9 | 9 | 10 | 10 | 9 |

TABLE 11

Results of evaluation by points

| Points | To 1 part by weight of powder c | | | | | |
|---|---|---|---|---|---|---|
| | 0.01 parts | 0.1 parts | 0.2 parts | 1 part | 5 parts | 10 parts |
| Sample 4 | 4 | 10 | 11 | 24 | 18 | 8 |
| Sample 5 | 0 | 2 | 4 | 10 | 6 | 2 |
| Sample 5:Sample 4 = 90:10 | 6 | 15 | 19 | 26 | 24 | 15 |
| Sample 5:Sample 4 = 10:90 | 12 | 24 | 27 | 40 | 36 | 24 |

This test confirmed that rebaudioside N and rebaudioside D attain a significantly better effect of improving the quality of sweetness of rebaudioside A (especially the effect of masking bitterness) when used in combination, relative to cases where they are used independently. It appeared that the amount of rebaudioside N is preferably greater than that of rebaudioside D in a combination of rebaudioside N and rebaudioside D.

An addition of 0.1 parts of a 90:10 mixture of sample 5 and sample 4 corresponds to an addition of 0.09 parts of sample 5 and an addition of 0.01 parts of sample 4. However, the evaluation by the number of panelists when 0.1 parts of a 90:10 mixture of sample 5 and sample 4 were added (8 panelists) exceeded the total of evaluation by the number of panelists when 0.1 parts of sample 5 were added (2 panelists) and evaluation by the number of panelists when 0.01 parts of sample 4 were added (3 panelists). Similarly, evaluation when 0.1 parts of a 10:90 mixture of sample 5 and sample 4 exceeded the total of evaluation when samples 5 and 4 were individually added. In view of the above, a combination of rebaudioside N and rebaudioside D is deemed as synergistically achieving an effect of improving the quality of sweetness of rebaudioside A.

Example 15

To 1 part by weight of powder c used in Example 4, 0.01 to 10 parts by weight of sample 3 (rebaudioside O), sample (rebaudioside D), a 90:10 mixture of sample 5 and sample 3, or a 10:90 mixture of sample 5 and sample 3 were added to prepare a 0.1% by weight aqueous solution. These samples were evaluated for the effect of improving the quality of sweetness on rebaudioside A as in Example 13 by the number of panelists and points.

TABLE 12

Results of evaluation by number of panelists

| Number of panelists | To 1 part by weight of powder c | | | | | |
|---|---|---|---|---|---|---|
| | 0.01 parts | 0.1 parts | 0.2 parts | 1 part | 5 parts | 10 parts |
| Sample 3 | 7 | 8 | 8 | 10 | 10 | 9 |
| Sample 5 | 0 | 2 | 4 | 10 | 6 | 2 |
| Sample 5:Sample 3 = 90:10 | 5 | 10 | 10 | 10 | 10 | 9 |
| Sample 5:Sample 3 = 10:90 | 8 | 10 | 10 | 10 | 10 | 10 |

TABLE 13

Results of evaluation by points

| Points | To 1 part by weight of powder c | | | | | |
|---|---|---|---|---|---|---|
| | 0.01 parts | 0.1 parts | 0.2 parts | 1 part | 5 parts | 10 parts |
| Sample 3 | 14 | 14 | 17 | 22 | 17 | 11 |
| Sample 5 | 0 | 3 | 4 | 10 | 6 | 2 |
| Sample 5:Sample 3 = 90:10 | 6 | 19 | 20 | 28 | 25 | 20 |
| Sample 5:Sample 3 = 10:90 | 17 | 30 | 29 | 40 | 36 | 30 |

This test confirmed that rebaudioside O and rebaudioside D attain a significantly better effect of improving the quality of sweetness of rebaudioside A (especially the effect of masking bitterness) when used in combination, relative to cases where they are used independently. It appeared that the amount of rebaudioside O is preferably greater than that of rebaudioside D in a combination of rebaudioside O and rebaudioside D.

Example 16

To 1 part by weight of powder c used in Example 4, 0.01 to 10 parts by weight of sample 3 (rebaudioside O), sample 6 (rebaudioside M), a 90:10 mixture of sample 6 and sample 3, or a 10:90 mixture of sample 6 and sample 3 were added to prepare a 0.1% by weight aqueous solution. These samples were evaluated for the effect of improving the quality of sweetness on rebaudioside A as in Example 13 by the number of panelists and points.

TABLE 14

Results of evaluation by number of panelists

| Number of panelists | To 1 part by weight of powder c | | | | | |
|---|---|---|---|---|---|---|
| | 0.01 parts | 0.1 parts | 0.2 parts | 1 part | 5 parts | 10 parts |
| Sample 3 | 6 | 8 | 8 | 10 | 10 | 9 |
| Sample 6 | 0 | 4 | 7 | 10 | 6 | 3 |
| Sample 6:Sample 3 = 90:10 | 6 | 10 | 10 | 10 | 10 | 10 |
| Sample 6:Sample 3 = 10:90 | 10 | 10 | 10 | 10 | 10 | 10 |

TABLE 15

Results of evaluation by points

| Points | To 1 part by weight of powder c | | | | | |
|---|---|---|---|---|---|---|
| | 0.01 parts | 0.1 parts | 0.2 parts | 1 part | 5 parts | 10 parts |
| Sample 3 | 8 | 14 | 15 | 20 | 16 | 12 |
| Sample 6 | 0 | 4 | 7 | 10 | 6 | 3 |
| Sample 6:Sample 3 = 90:10 | 10 | 20 | 25 | 30 | 26 | 22 |
| Sample 6:Sample 3 = 10:90 | 22 | 32 | 35 | 40 | 36 | 32 |

This test confirmed that rebaudioside O and rebaudioside M attain a significantly better effect of improving the quality of sweetness of rebaudioside A (especially the effect of masking bitterness) when used in combination, relative to cases where they are used independently. Further, a combination of rebaudioside O and rebaudioside M is especially preferable for enhancing smoothness and richness in the sweetness of rebaudioside A. It appeared that the amount of rebaudioside O is preferably greater than that of rebaudioside M in a combination of rebaudioside O and rebaudioside M.

Example 17

To 1 part by weight of powder c used in Example 4, 0.01 to 10 parts by weight of sample 6 (rebaudioside M), sample (rebaudioside N), a 90:10 mixture of sample 6 and sample 4, or a 10:90 mixture of sample 6 and sample 4 were added to prepare a 0.1% by weight aqueous solution. These samples were evaluated for the effect of improving the quality of sweetness on rebaudioside A as in Example 13 by the number of panelists and points.

TABLE 16

Results of evaluation by number of panelists

| Number of panelists | To 1 part by weight of powder c | | | | | |
|---|---|---|---|---|---|---|
| | 0.01 parts | 0.1 parts | 0.2 parts | 1 part | 5 parts | 10 parts |
| Sample 6 | 0 | 4 | 5 | 10 | 6 | 3 |

TABLE 16-continued

Results of evaluation by number of panelists

| Number of panelists | To 1 part by weight of powder c | | | | | |
|---|---|---|---|---|---|---|
| | 0.01 parts | 0.1 parts | 0.2 parts | 1 part | 5 parts | 10 parts |
| Sample 4 | 3 | 6 | 6 | 10 | 10 | 6 |
| Sample 6:Sample 4 = 90:10 | 5 | 9 | 10 | 10 | 10 | 10 |
| Sample 6:Sample 4 = 10:90 | 7 | 10 | 10 | 10 | 10 | 10 |

TABLE 17

Results of evaluation by points

| Points | To 1 part by weight of powder c | | | | | |
|---|---|---|---|---|---|---|
| | 0.01 parts | 0.1 parts | 0.2 parts | 1 part | 5 parts | 10 parts |
| Sample 6 | 0 | 4 | 5 | 10 | 6 | 3 |
| Sample 4 | 5 | 14 | 15 | 22 | 17 | 9 |
| Sample 6:Sample 4 = 90:10 | 6 | 15 | 17 | 28 | 25 | 19 |
| Sample 6:Sample 4 = 10:90 | 15 | 29 | 31 | 40 | 36 | 29 |

This test confirmed that rebaudioside M and rebaudioside N attain a significantly better effect of improving the quality of sweetness of rebaudioside A (especially the effect of masking bitterness) when used in combination, relative to cases where they are used independently. It appeared that the amount of rebaudioside N is preferably greater than that of rebaudioside M in a combination of rebaudioside M and rebaudioside N.

An addition of 0.1 parts of a 90:10 mixture of sample 6 and sample 4 corresponds to an addition of 0.09 parts of sample 6 and an addition of 0.01 parts of sample 4. However, the evaluation by the number of panelists when 0.1 parts of a 90:10 mixture of sample 6 and sample 4 were added (9 panelists) exceeded the total of evaluation by the number of panelists when 0.1 parts of sample 6 were added (4 panelists) and evaluation by the number of panelists when 0.01 parts of sample 4 were added (3 panelists). Similarly, evaluation when 0.1 parts of a 10:90 mixture of sample 6 and sample 4 exceeded the total of evaluation when samples 6 and 4 were individually added. In view of the above, a combination of rebaudioside N and rebaudioside M is deemed as synergistically achieving an effect of improving the quality of sweetness of rebaudioside A.

Example 18

To 1 part by weight of powder c used in Example 4, 0.01 to 10 parts by weight of sample 5 (rebaudioside D), a 30:30:40 mixture of sample 5, sample 6 (rebaudioside M), and sample 3 (rebaudioside O), or a 40:40:20 mixture of sample 5, sample 6, and sample 4 (rebaudioside N) were added to prepare a 0.1% by weight aqueous solution. These samples were evaluated for the effect of improving the quality of sweetness on rebaudioside A as in Example 13 by the number of panelists and points.

TABLE 18

Results of evaluation by number of panelists

| Number of panelists | To 1 part by weight of powder c | | | | | |
|---|---|---|---|---|---|---|
| | 0.01 parts | 0.1 parts | 0.2 parts | 1 part | 5 parts | 10 parts |
| Sample 5 | 0 | 2 | 4 | 10 | 6 | 2 |
| Sample 5:Sample 6:Sample 3 = 30:30:40 | 7 | 8 | 9 | 10 | 10 | 9 |
| Sample 5:Sample 6:Sample 4 = 40:40:20 | 5 | 7 | 7 | 10 | 8 | 6 |

TABLE 19

Results of evaluation by points

| Points | To 1 part by weight of powder c | | | | | |
|---|---|---|---|---|---|---|
| | 0.01 parts | 0.1 parts | 0.2 parts | 1 part | 5 parts | 10 parts |
| Sample 5 | 0 | 2 | 4 | 10 | 6 | 2 |
| Sample 5:Sample 6:Sample 3 = 30:30:40 | 12 | 15 | 19 | 30 | 24 | 17 |
| Sample 5:Sample 6:Sample 4 = 40:40:20 | 5 | 7 | 14 | 20 | 14 | 8 |

This test confirmed that rebaudioside D attains a significantly better effect of improving the quality of sweetness of rebaudioside A (especially the effect of masking bitterness) when used in combination with rebaudioside N, M, O, or the like, relative to cases where they are used independently.

Example 19

To 1 part by weight of powder c used in Example 4, 0.01 to 10 parts by weight of a 50:50 mixture of sample 5 (rebaudioside D) and sample 6 (rebaudioside M), a 50:50 mixture of sample 5 and sample 3 (rebaudioside O), or a 50:50 mixture of sample 5 and sample 4 (rebaudioside N) were added to prepare a 0.1% by weight aqueous solution. These samples were evaluated for the effect of improving the quality of sweetness on rebaudioside A as in Example 13 by the number of panelists and points.

TABLE 20

Results of evaluation by number of panelists

| Number of panelists | To 1 part by weight of powder c | | | | | |
|---|---|---|---|---|---|---|
| | 0.01 parts | 0.1 parts | 0.2 parts | 1 part | 5 parts | 10 parts |
| Sample 5:Sample 6 = 50:50 | 0 | 4 | 9 | 10 | 10 | 6 |
| Sample 5:Sample 3 = 50:50 | 5 | 10 | 10 | 10 | 10 | 10 |
| Sample 5:Sample 4 = 50:50 | 3 | 7 | 9 | 10 | 10 | 9 |

TABLE 21

Results of evaluation by points

| Points | To 1 part by weight of powder c | | | | | |
|---|---|---|---|---|---|---|
| | 0.01 parts | 0.1 parts | 0.2 parts | 1 part | 5 parts | 10 parts |
| Sample 5:Sample 6 = 50:50 | 0 | 4 | 9 | 10 | 10 | 6 |
| Sample 5:Sample 3 = 50:50 | 8 | 21 | 28 | 30 | 30 | 25 |
| Sample 5:Sample 4 = 50:50 | 3 | 10 | 18 | 20 | 20 | 15 |

As is apparent from the results in Tables 20 and 21, an effect of improving the quality of sweetness or the effect of masking bitterness on rebaudioside A was not observed when rebaudioside D was combined with rebaudioside M, but a significant effect of improving the quality of sweetness (especially the effect of masking bitterness) on rebaudioside A was confirmed when rebaudioside D was combined with rebaudioside O or N.

Example 20

The test of Example 19 was conducted under the same conditions except for changing the mixture ratio of each sample from 50:50 to 90:10.

TABLE 22

Results of evaluation by number of panelists

| Number of panelists | To 1 part by weight of powder c | | | | | |
|---|---|---|---|---|---|---|
| | 0.01 parts | 0.1 parts | 0.2 parts | 1 part | 5 parts | 10 parts |
| Sample 5:Sample 6 = 90:10 | 0 | 2 | 4 | 10 | 8 | 2 |
| Sample 5:Sample 3 = 90:10 | 3 | 10 | 10 | 10 | 10 | 9 |
| Sample 5:Sample 4 = 90:10 | 2 | 7 | 8 | 10 | 10 | 7 |

TABLE 23

Results of evaluation by points

| Points | To 1 part by weight of powder c | | | | | |
|---|---|---|---|---|---|---|
| | 0.01 parts | 0.1 parts | 0.2 parts | 1 part | 5 parts | 10 parts |
| Sample 5:Sample 6 = 90:10 | 0 | 2 | 4 | 10 | 8 | 2 |
| Sample 5:Sample 3 = 90:10 | 5 | 17 | 22 | 30 | 28 | 18 |
| Sample 5:Sample 4 = 90:10 | 2 | 7 | 12 | 20 | 18 | 9 |

The effect confirmed in Example 19 was confirmed to be achieved independent of the mixture ratio of each rebaudioside.

Example 21

To 1 part by weight of powder c used in Example 4, 0.01 to 10 parts by weight of a 50:50 mixture of sample 5 (rebaudioside D) and sample 6 (rebaudioside M), a 50:50 mixture of sample 3 (rebaudioside O) and sample 6, or a 50:50 mixture of sample 4 (rebaudioside N) and sample 6 were added to prepare a 0.1% by weight aqueous solution. These samples were evaluated for the effect of improving the quality of sweetness on rebaudioside A as in Example 13 by the number of panelists and points.

TABLE 24

Results of evaluation by number of panelists

| Number of panelists | To 1 part by weight of powder c | | | | | |
|---|---|---|---|---|---|---|
| | 0.01 parts | 0.1 parts | 0.2 parts | 1 part | 5 parts | 10 parts |
| Sample 5:Sample 6 = 50:50 | 0 | 4 | 9 | 10 | 10 | 6 |
| Sample 3:Sample 6 = 50:50 | 8 | 10 | 10 | 10 | 10 | 10 |
| Sample 4:Sample 6 = 50:50 | 4 | 10 | 10 | 10 | 10 | 10 |

TABLE 25

Results of evaluation by points

| Points | To 1 part by weight of powder c | | | | | |
|---|---|---|---|---|---|---|
| | 0.01 parts | 0.1 parts | 0.2 parts | 1 part | 5 parts | 10 parts |
| Sample 5:Sample 6 = 50:50 | 0 | 4 | 9 | 10 | 10 | 6 |
| Sample 3:Sample 6 = 50:50 | 13 | 24 | 29 | 30 | 30 | 26 |
| Sample 4:Sample 6 = 50:50 | 4 | 14 | 19 | 20 | 20 | 16 |

As is apparent from the results in Tables 24 and 25, an effect of improving the quality of sweetness (especially the effect of masking bitterness) on rebaudioside A was not observed when rebaudioside M was combined with rebaudioside D, but a significant effect of improving the quality of sweetness (especially the effect of masking bitterness) on rebaudioside A was confirmed when rebaudioside M was combined with rebaudioside O or N.

Example 22

The test of Example 21 was conducted under the same conditions except for changing the mixture ratio of each sample from 50:50 to 10:90.

TABLE 26

Results of evaluation by number of panelists

| Number of panelists | To 1 part by weight of powder c | | | | | |
|---|---|---|---|---|---|---|
| | 0.01 parts | 0.1 parts | 0.2 parts | 1 part | 5 parts | 10 parts |
| Sample 5:Sample 6 = 10:90 | 0 | 4 | 7 | 10 | 8 | 4 |
| Sample 3:Sample 6 = 10:90 | 6 | 10 | 10 | 10 | 10 | 10 |
| Sample 4:Sample 6 = 10:90 | 3 | 9 | 10 | 10 | 10 | 10 |

TABLE 27

Results of evaluation by points

| Points | To 1 part by weight of powder c | | | | | |
|---|---|---|---|---|---|---|
| | 0.01 parts | 0.1 parts | 0.2 parts | 1 part | 5 parts | 10 parts |
| Sample 5:Sample 6 = 10:90 | 0 | 4 | 7 | 10 | 8 | 4 |
| Sample 3:Sample 6 = 10:90 | 9 | 23 | 27 | 30 | 28 | 24 |
| Sample 4:Sample 6 = 10:90 | 3 | 13 | 17 | 20 | 18 | 14 |

The effect confirmed in Example 21 was confirmed to be achieved independent of the mixture ratio of each rebaudioside.

Example 23

To 1 part by weight of powder c used in Example 4, 0.01 to 10 parts by weight of RB (rebaudioside B), a 90:10 mixture of sample 3 (rebaudioside O) and RB, or a 90:10 mixture of sample 3 and sample 4 (rebaudioside N) were added to prepare a 0.1% by weight aqueous solution. These samples were evaluated for the effect of improving the quality of sweetness on rebaudioside A as in Example 13 by the number of panelists.

TABLE 28

Number of panelists

| Number of panelists | To 1 part by weight of powder c | | | | | |
|---|---|---|---|---|---|---|
| | 0.01 parts | 0.1 parts | 0.2 parts | 1 part | 5 parts | 10 parts |
| RB | 0 | 0 | 0 | 0 | 0 | 0 |
| Sample 3:RB = 90:10 | 6 | 8 | 8 | 9 | 7 | 4 |
| Sample 3:Sample 4 = 90:10 | 8 | 10 | 10 | 10 | 10 | 10 |

The same evaluation was performed after changing the mixture ratio of each rebaudioside.

TABLE 29

| | To 1 part by weight of powder c | | | | | |
|---|---|---|---|---|---|---|
| Number of panelists | 0.01 parts | 0.1 parts | 0.2 parts | 1 part | 5 parts | 10 parts |
| RB | 0 | 0 | 0 | 0 | 0 | 0 |
| Sample 3:RB = 10:90 | 0 | 0 | 0 | 0 | 0 | 0 |
| Sample 3:Sample 4 = 10:90 | 6 | 9 | 10 | 10 | 10 | 10 |

The results in Tables 28 and 29 confirmed that the effect of combining rebaudioside O with rebaudioside N confirmed in the preceding Examples is not attained simply by combining rebaudioside O with any rebaudioside (rebaudioside B in this Example), but is attained by combining with rebaudioside N. The same is considered applicable to the effect of combining with rebaudioside D (Example 15) or rebaudioside M (Example 16).

Example 24

To 1 part by weight of powder c used in Example 4, 0.01 to 10 parts by weight of RC (rebaudioside C), a 90:10 mixture of sample 4 (rebaudioside N) and RC, or a 90:10 mixture of sample 3 (rebaudioside O) and sample 4 were added to prepare a 0.1% by weight aqueous solution. These samples were evaluated for the effect of improving the quality of sweetness on rebaudioside A as in Example 13 by the number of panelists.

TABLE 30

| | To 1 part by weight of powder c | | | | | |
|---|---|---|---|---|---|---|
| Number of panelists | 0.01 parts | 0.1 parts | 0.2 parts | 1 part | 5 parts | 10 parts |
| RC | 0 | 0 | 0 | 0 | 0 | 0 |
| Sample 4:RC = 90:10 | 5 | 4 | 4 | 2 | 0 | 0 |
| Sample 4:Sample 3 = 90:10 | 6 | 9 | 10 | 10 | 10 | 10 |

The same evaluation was performed after changing the mixture ratio of each rebaudioside.

TABLE 31

| | To 1 part by weight of powder c | | | | | |
|---|---|---|---|---|---|---|
| Number of panelists | 0.01 parts | 0.1 parts | 0.2 parts | 1 part | 5 parts | 10 parts |
| RC | 0 | 0 | 0 | 0 | 0 | 0 |
| Sample 4:RC = 10:90 | 0 | 0 | 0 | 0 | 0 | 0 |
| Sample 4:Sample 3 = 10:90 | 8 | 10 | 10 | 10 | 10 | 10 |

The results in Tables 30 and 31 confirmed that the effect of combining rebaudioside N with rebaudioside O confirmed in the preceding Examples is not attained simply by combining rebaudioside N with any rebaudioside (rebaudioside C in this Example), but is attained by combining with rebaudioside O. The same is considered applicable to the effect of combining with rebaudioside D (Example 14) or rebaudioside M (Example 17).

Example 25 Candy

A candy prepared with 0.3 g of powder c, 100 g of palatinit, and 0.1 mL of lemon flavoring, and a candy prepared with 0.3 g of sweetener formulated by adding 0.1 parts by weight of sample 1 to 1 part by weight of powder c, 100 g of palatinit, and 0.1 mL of lemon flavoring were made and compared. Richness was enhanced and bitterness was reduced more when using a sweetener formulated by adding sample 1 to powder c. Furthermore, the lemon scent was intensified and lasted.

Furthermore, a candy prepared with 0.05 g of powder c, 100 g of palatinit, 1.4 g of citric acid, and 0.1 mL of lemon flavoring, a candy prepared with 0.05 g of powder c, 0.0025 g of sample 1, 100 g of palatinit, 1.4 g of citric acid, and 0.1 mL of lemon flavoring, a candy prepared with 0.05 g of powder c, 0.005 g of sample 1, 100 g of palatinit, 1.4 g of citric acid, and 0.1 mL of lemon flavoring, a candy prepared with 0.05 g of powder c, 0.0025 g of sample 3, 0.0025 g of sample 5, 100 g of palatinit, 1.4 g of citric acid, and 0.1 mL of lemon flavoring, and a candy prepared with 0.05 g of powder c, 0.0025 g of sample 3, 0.0025 g of sample 6, 100 g of palatinit, 1.4 g of citric acid, and 0.1 mL of lemon flavoring were made and compared. The following Tables show the results.

TABLE 32

| Candy (to 100 parts by weight of palatinit) | Number of panelists |
|---|---|
| Powder c (0.05 parts by weight) | 0 |
| Powder c (0.05 parts by weight), sample 1 (0.005 parts by weight) | 10 |
| Powder c (0.05 parts by weight), sample 3 (0.0025 parts by weight), sample 5 (0.0025 parts by weight) | 10 |
| Powder c (0.05 parts by weight), sample 3 (0.0025 parts by weight), sample 6 (0.0025 parts by weight) | 10 |

TABLE 33

| Candy (to 100 parts by weight of palatinit) | Points |
|---|---|
| Powder c (0.05 parts by weight) | 0 |
| Powder c (0.05 parts by weight), sample 1 (0.005 parts by weight) | 10 |
| Powder c (0.05 parts by weight), sample 3 (0.0025 parts by weight), sample 5 (0.0025 parts by weight) | 20 |
| Powder c (0.05 parts by weight), sample 3 (0.0025 parts by weight), sample 6 (0.0025 parts by weight) | 30 |

The combination of sample 3 and sample 5 (rebaudioside O and rebaudioside D) had a greater effect of improving the quality of sweetness on powder c than sample 1. The combination of sample 3 and sample 6 (rebaudioside O and rebaudioside M) had an even greater effect of improving the quality of sweetness. A trend similar to the trend in the effect of improving the quality of sweetness was also observed for the effect of enhancing and sustaining lemon scent.

Example 26 Milk Jelly

A milk jelly prepared with 0.03 g of powder d, 15 g of sugar, 250 g of milk, 5 g of gelatin, and 3 mL of milk flavor and a milk jelly prepared with 0.03 g of sweetener formulated by adding 0.2 parts by weight of sample 2 to 1 part by weight of powder d, 15 g of sugar, 250 g of milk, 5 g of gelatin, and 3 mL of milk flavor were made and compared. Richness was enhanced and bitterness was reduced more when using a sweetener formulated by adding sample 2 to powder d. Furthermore, the milk flavor scent was intensified and lasted.

Furthermore, a milk jelly prepared with 0.03 g of powder c, 15 g of sugar, 250 g of milk, 5 g of gelatin, and 3 mL of milk flavor, a milk jelly prepared with 0.03 g of powder c, 0.003 g of sample 1, 15 g of sugar, 250 g of milk, 5 g of gelatin, and 3 mL of milk flavor, a milk jelly prepared with 0.03 g of powder c, 0.0015 g of sample 4, 0.0015 g of sample 5, 15 g of sugar, 250 g of milk, 5 g of gelatin, and 3 mL of milk flavor, and a milk jelly prepared with 0.03 g of powder c, 0.0015 g of sample 4, 0.0015 g of sample 6, 15 g of sugar, 250 g of milk, 5 g of gelatin, and 3 mL of milk flavor were made and compared. The following Tables show the results.

TABLE 34

| Milk jelly (to 250 parts by weight of milk) | Number of panelists |
|---|---|
| Powder c (0.03 parts by weight) | 0 |
| Powder c (0.03 parts by weight), sample 1 (0.003 parts by weight) | 10 |

TABLE 34-continued

| Milk jelly (to 250 parts by weight of milk) | Number of panelists |
|---|---|
| Powder c (0.03 parts by weight), sample 4 (0.0015 parts by weight), sample 5 (0.0015 parts by weight) | 10 |
| Powder c (0.03 parts by weight), sample 4 (0.0015 parts by weight), sample 6 (0.0015 parts by weight) | 10 |

TABLE 35

| Milk jelly (to 250 parts by weight of milk) | Points |
|---|---|
| Powder c (0.03 parts by weight) | 0 |
| Powder c (0.03 parts by weight), sample 1 (0.003 parts by weight) | 10 |
| Powder c (0.03 parts by weight), sample 4 (0.0015 parts by weight), sample 5 (0.0015 parts by weight) | 20 |
| Powder c (0.03 parts by weight), sample 4 (0.0015 parts by weight), sample 6 (0.0015 parts by weight) | 30 |

The combination of sample 4 and sample 5 (rebaudioside N and rebaudioside D) had a greater effect of improving the quality of sweetness on powder c than sample 1. The combination of sample 4 and sample 6 (rebaudioside N and rebaudioside M) had an even greater effect of improving the quality of sweetness. A trend similar to the trend in the effect of improving the quality of sweetness was also observed for the effect of enhancing and sustaining milk flavor scent.

Example 27 Sports Drink

A sports drink was prepared with 0.07% by weight of sweetener formulated by adding 1 part by weight of sample 1 to 1 part by weight of powder d, 0.11% by weight of calcium lactate, 0.045% by weight of citric acid, 0.03% by weight of trisodium citrate, 0.015% by weight of magnesium chloride, 0.005% by weight of glutamic acid, and 99.725% by weight of water.

Furthermore, with a base mixture of 0.11% by weight of calcium lactate, 0.045% by weight of citric acid, 0.03% by weight of trisodium citrate, 0.015% by weight of magnesium chloride, 0.005% by weight of glutamic acid, and 99.755% by weight of water, a sports drink prepared with 0.04 g of powder c, a sports drink prepared with 0.04 g of powder c and 0.004 g of sample 1, a sports drink prepared with 0.04 g of powder c, 0.002 g of sample 5, and 0.002 g of sample 3, and a sports drink prepared with 0.04 g of powder c, 0.002 g of sample 5, and 0.002 g of sample 4 were made and compared. The following Tables show the results.

TABLE 36

| Sports drink (to 99.96 parts by weight of base) | Number of panelists |
|---|---|
| Powder c (0.04 parts by weight) | 0 |
| Powder c (0.04 parts by weight), sample 1 (0.004 parts by weight) | 10 |
| Powder c (0.04 parts by weight), sample 5 (0.002 parts by weight), sample 3 (0.002 parts by weight) | 10 |
| Powder c (0.04 parts by weight), sample 5 (0.002 parts by weight), sample 4 (0.002 parts by weight) | 10 |

TABLE 37

| Sports drink (to 99.96 parts by weight of base) | Points |
|---|---|
| Powder c (0.04 parts by weight) | 0 |
| Powder c (0.04 parts by weight), sample 1 (0.004 parts by weight) | 10 |
| Powder c (0.04 parts by weight), sample 5 (0.002 parts by weight), sample 3 (0.002 parts by weight) | 30 |
| Powder c (0.04 parts by weight), sample 5 (0.002 parts by weight), sample 4 (0.002 parts by weight) | 20 |

The combination of sample 5 and sample 4 (rebaudioside D and rebaudioside N) had a greater effect of improving the quality of sweetness on powder c than sample 1. The combination of sample 5 and sample 3 (rebaudioside D and rebaudioside O) had an even greater effect of improving the quality of sweetness.

Example 28 Carbonated Beverage

A carbonated beverage was prepared using 0.013% by weight of sweetener formulated by adding 0.3 parts by weight of sample 1 to 1 part by weight of powder d, 5.4% by weight of fructose, 0.6% by weight of citric acid, 0.1% by weight of alginic acid, 0.1% by weight of inositol, 0.0025% by weight of caffeine, 0.003% by weight of calcium pantothenate, 0.003% by weight of niacinamide, 0.002% by weight of vitamin B6, 0.00009% by weight of vitamin B2, 0.000002% by weight of vitamin B12, a suitable amount of flavoring, and a suitable amount of water constituting 100% by weight, and infusing carbon dioxide gas.

Furthermore, to a base of 5.4% by weight of fructose, 0.6% by weight of citric acid, 0.1% by weight of alginic acid, 0.1% by weight of inositol, 0.0025% by weight of caffeine, 0.003% by weight of calcium pantothenate, 0.003% by weight of niacinamide, 0.002% by weight of vitamin B6, 0.00009% by weight of vitamin B2, 0.000002% by weight of vitamin B12, a suitable amount of flavoring, and a suitable amount of water constituting 100% by weight, 0.01 g of powder c was added and carbon dioxide gas was infused to prepare a carbonated beverage. A carbonated beverage was similarly prepared by adding 0.01 g of powder c and 0.001 g of sample 1 instead of 0.01 g of powder c and infusing carbon dioxide gas. A carbonated beverage was prepared by adding 0.01 g of powder c, 0.0005 g of sample 6, and 0.0005 g of sample 3 and infusing carbon dioxide gas. A carbonated beverage was prepared by adding 0.01 g of powder c, 0.0005 g of sample 6, and 0.0005 g of sample 4 and infusing carbonated gas. The beverages were compared. The following Tables show the results.

TABLE 38

| Carbonated beverage (to 99.99 parts by weight of base) | Number of panelists |
|---|---|
| Powder c (0.01 parts by weight) | 0 |
| Powder c (0.01 parts by weight), sample 1 (0.001 parts by weight) | 10 |
| Powder c (0.01 parts by weight), sample 6 (0.0005 parts by weight), sample 3 (0.0005 parts by weight) | 10 |
| Powder c (0.01 parts by weight), sample 6 (0.0005 parts by weight), sample 4 (0.0005 parts by weight) | 10 |

TABLE 39

| Carbonated beverage (to 99.99 parts by weight of base) | Points |
| --- | --- |
| Powder c (0.01 parts by weight) | 0 |
| Powder c (0.01 parts by weight), sample 1 (0.001 parts by weight) | 10 |
| Powder c (0.01 parts by weight), sample 6 (0.0005 parts by weight), sample 3 (0.0005 parts by weight) | 30 |
| Powder c (0.01 parts by weight), sample 6 (0.0005 parts by weight), sample 4 (0.0005 parts by weight) | 20 |

The combination of sample 6 and sample 4 (rebaudioside M and rebaudioside N) had a greater effect of improving the quality of sweetness on powder c than sample 1. The combination of sample 6 and sample 3 (rebaudioside M and rebaudioside O) had an even greater effect of improving the quality of sweetness.

Example 29 Table Sugar

1) Table sugar was prepared by mixing 0.15 g of sample 1 and 99.85 g of erythritol.
2) Table sugar was prepared by mixing 0.1 g of sweetener formulated by adding 0.1 parts by weight of sample 1 to 1 part by weight of powder b and 99.9 g of powdered sugar.
3) Table sugar was prepared by mixing 0.1 g of sweetener formulated by adding 0.2 parts by weight of sample 1 to 1 part by weight of powder c and 99.9 g of high-fructose corn syrup.
4) Table sugar was prepared by mixing 0.15 g of sweetener formulated by adding 10 parts by weight of sample 1 to 1 part by weight of powder d and 99.85 g of erythritol.

Furthermore, table sugar was prepared by mixing 2 g of erythritol with 0.046 g of powder c. Table sugar was similarly prepared by mixing 2 g of erythritol with 0.046 g of powder c and 0.0046 g of sample 1 instead of 0.046 g of powder c. Table sugar was prepared by mixing 0.046 g of powder c, 0.0023 g of sample 4, and 0.0023 g of sample 5. Table sugar was prepared by mixing 0.046 g of powder c, 0.0023 g of sample 3, and 0.0023 g of sample 6. The table sugars were compared. The following Tables show the results.

TABLE 40

| Table sugar (to 2 parts by weight of erythritol) | Number of panelists |
| --- | --- |
| Powder c (0.046 parts by weight) | 0 |
| Powder c (0.046 parts by weight), sample 1 (0.0046 parts by weight) | 10 |
| Powder c (0.046 parts by weight), sample 4 (0.0023 parts by weight), sample 5 (0.0023 parts by weight) | 10 |
| Powder c (0.046 parts by weight), sample 3 (0.0023 parts by weight), sample 6 (0.0023 parts by weight) | 10 |

TABLE 41

| Table sugar (to 2 parts by weight of erythritol) | Points |
| --- | --- |
| Powder c (0.046 parts by weight) | 0 |
| Powder c (0.046 parts by weight), sample 1 (0.0046 parts by weight) | 10 |
| Powder c (0.046 parts by weight), sample 4 (0.0023 parts by weight), sample 5 (0.0023 parts by weight) | 20 |

TABLE 41-continued

| Table sugar (to 2 parts by weight of erythritol) | Points |
| --- | --- |
| Powder c (0.046 parts by weight), sample 3 (0.0023 parts by weight), sample 6 (0.0023 parts by weight) | 30 |

The combination of sample 4 and sample 5 (rebaudioside N and rebaudioside D) had a greater effect of improving the quality of sweetness on powder c than sample 1. The combination of sample 3 and sample 6 (rebaudioside M and rebaudioside O) had an even greater effect of improving the quality of sweetness.

INDUSTRIAL APPLICABILITY

The sweetener composition of the invention can be used in food products, medicines, and cosmetic products as an excellent sugar substitute sweetener on its own. The sweetener composition of the invention can also be used in combination with an additional sweetener to improve the quality of sweetness of the additional sweetener especially/or mask bitterness, such that the sweetener composition can be used in food products, medicines, and cosmetic products as an excellent sugar substitute sweetener.

The invention claimed is:
1. A composition comprising
  i) a sweetener composition comprising rebaudioside O and rebaudioside N, and
  ii) rebaudioside A,
  wherein in the sweetener composition,
    rebaudioside O is present in an amount of 10% to 90% by weight of the sweetener composition, and
    the amount of rebaudioside O is 110% to 900% by weight of the amount of rebaudioside N,
    wherein the sweetener composition is 0.02 to 0.35 parts by weight to 1 part by weight of the rebaudioside A in the composition, and
    wherein the rebaudioside A is 74 to 98% by weight of the composition.
2. The composition of claim 1, wherein the amount of rebaudioside O is 110% to 500% by weight of the amount of rebaudioside N.
3. The composition of claim 1, wherein the sweetener composition further comprises rebaudioside D and rebaudioside M.
4. The composition of claim 3, wherein rebaudioside D is present in an amount of 10% to 60% by weight of the sweetener composition, and rebaudioside M is present in an amount of 20% to 80% by weight of the sweetener composition.
5. The composition of claim 3, wherein at least one of rebaudioside D, rebaudioside M, rebaudioside O, and rebaudioside N is a stevia extract and/or obtained by purification with hydrophilic alcohol.
6. The composition of claim 1 further comprising an additional sweetener.
7. A food product comprising the composition of claim 1 and a food.
8. The food product of claim 7, wherein the sweetener composition is present in an amount of 0.0001 to 2.0% by weight.
9. A bitterness masking flavor or a flavor enhancer, comprising an additional sweetener and the composition of claim 1 at a weight ratio of 1:0.01 to 1:99.

10. A method of manufacturing a food product comprising admixing the composition of claim 1 and a food to form the food product.

11. A composition comprising
   i) a sweetener composition comprising rebaudioside O and rebaudioside N, and
   ii) rebaudioside A,
   wherein in the sweetener composition,
      rebaudioside O and rebaudioside N are present in a ratio of 90:10 by weight, and
      wherein the sweetener composition is 0.02 to 0.35 parts by weight to 1 part by weight of the rebaudioside A in the composition, and
      wherein the rebaudioside A is 74 to 98% by weight of the composition.

\* \* \* \* \*